United States Patent
Zeibig et al.

(10) Patent No.: US 12,246,698 B2
(45) Date of Patent: Mar. 11, 2025

(54) METHOD FOR CONTROLLING A HYBRID DRIVE SYSTEM FOR A MOTOR VEHICLE

(71) Applicant: MERCEDES-BENZ GROUP AG, Stuttgart (DE)

(72) Inventors: Jonathan Zeibig, Aalen (DE); Nils Tonius, Ludwigsburg (DE); Peter Fritzmann, Mötzingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 324 days.

(21) Appl. No.: 18/010,848

(22) PCT Filed: Jun. 2, 2021

(86) PCT No.: PCT/EP2021/064863
§ 371 (c)(1),
(2) Date: Dec. 16, 2022

(87) PCT Pub. No.: WO2021/254781
PCT Pub. Date: Dec. 23, 2021

(65) Prior Publication Data
US 2023/0242092 A1 Aug. 3, 2023

(30) Foreign Application Priority Data
Jun. 17, 2020 (DE) ...................... 10 2020 003 588.4

(51) Int. Cl.
*B60W 20/30* (2016.01)
*B60W 10/06* (2006.01)
*B60W 10/08* (2006.01)
*B60W 10/115* (2012.01)
*F16H 59/14* (2006.01)
*F16H 61/10* (2006.01)

(52) U.S. Cl.
CPC ............ *B60W 20/30* (2013.01); *B60W 10/06* (2013.01); *B60W 10/08* (2013.01);
(Continued)

(58) Field of Classification Search
CPC ............... B60W 20/30; B60W 10/115; B60W 2540/10; B60W 2540/16;
(Continued)

(56) References Cited

U.S. PATENT DOCUMENTS

| 4,742,733 A | 5/1988 | Schreiner |
| 9,358,868 B2 | 6/2016 | Wenzel et al. |

(Continued)

FOREIGN PATENT DOCUMENTS

| DE | 3534971 A1 | 4/1986 |
| DE | 102009021456 A1 | 11/2010 |

(Continued)

OTHER PUBLICATIONS

International Search Report and Written Opinion mailed Oct. 1, 2021 in related/corresponding International Application No. PCT/EP2021/064863.

(Continued)

*Primary Examiner* — Roger L Pang
(74) *Attorney, Agent, or Firm* — PATENT PORTFOLIO BUILDERS PLLC

(57) ABSTRACT

A method for controlling a hybrid drive system for a motor vehicle involves, in an operation in which both the internal combustion engine and the electric machine introduce drive torques into the hybrid gearbox to drive the drive wheel, employing third limit torques for the third gearbox gear are provided in a first mode, and second limit torques for the second gearbox gear are provided in a second mode. A maximum third limit torque of the first mode is greater than a maximum second limit torque of the second mode.

4 Claims, 2 Drawing Sheets

Figure 1:
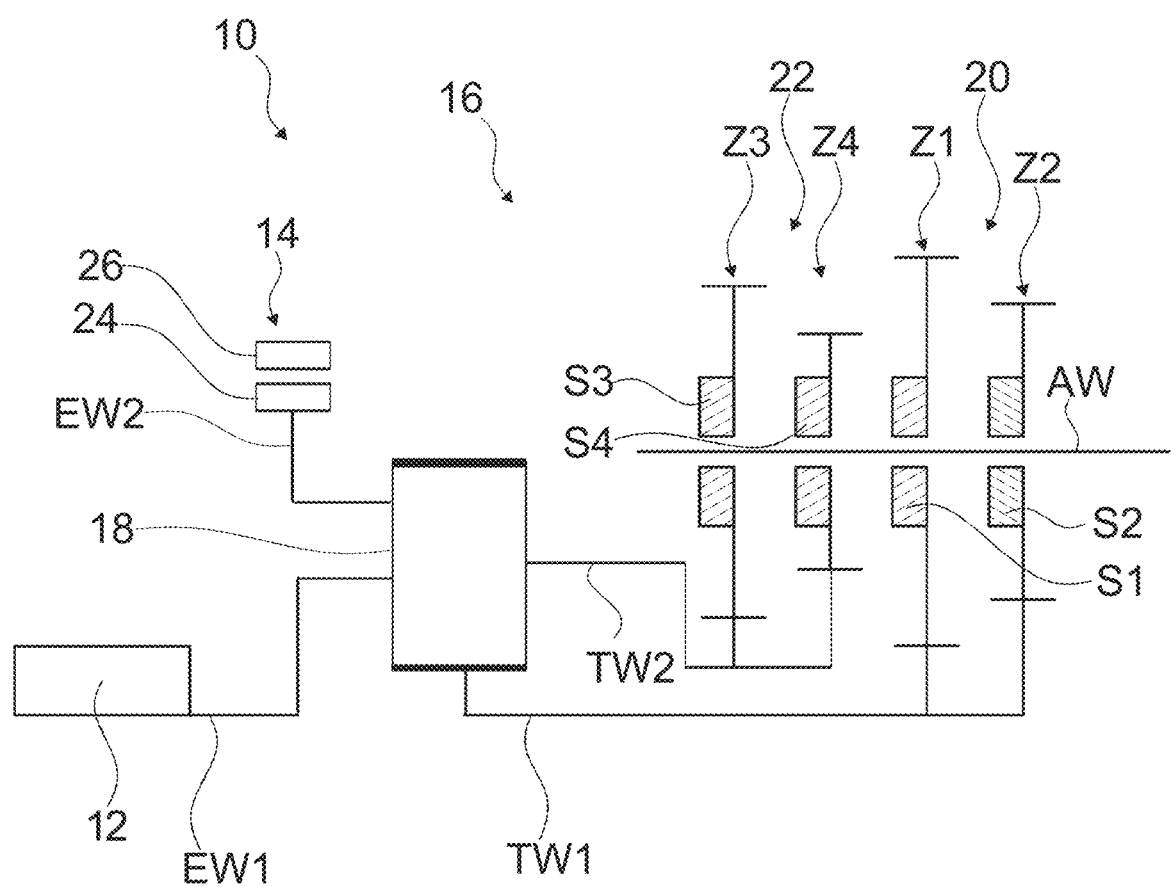

(52) U.S. Cl.
CPC ........... *B60W 10/115* (2013.01); *F16H 59/14* (2013.01); *F16H 61/10* (2013.01); *B60W 2510/1025* (2013.01); *B60W 2540/10* (2013.01); *B60W 2540/16* (2013.01); *B60W 2710/1005* (2013.01); *B60W 2710/1022* (2013.01)

(58) Field of Classification Search
CPC ......... B60W 2710/1005; B60W 10/11; B60W 20/15; B60W 2510/1025; F16H 59/14; F16H 2059/147; F16H 56/24; F16H 61/10; B60K 6/365
USPC .................................................. 701/51; 477/3
See application file for complete search history.

(56) References Cited

U.S. PATENT DOCUMENTS

| | | |
|---|---|---|
| 2005/0000479 A1 | 1/2005 | Niki et al. |
| 2007/0205735 A1 | 9/2007 | Kiuchi et al. |
| 2008/0153664 A1* | 6/2008 | Tabata ................... B60K 6/547 477/37 |
| 2012/0108384 A1 | 5/2012 | Tabata et al. |
| 2019/0061737 A1 | 2/2019 | Goto et al. |

FOREIGN PATENT DOCUMENTS

| | | |
|---|---|---|
| DE | 102013005252 A1 | 10/2014 |
| DE | 102017006082 A1 | 1/2019 |

OTHER PUBLICATIONS

Klement; "Hybridfahrzeuge: Getriebetechnologie an Beispielen;" Chapter 7; 2017; pp. 95-113; Carl Hanser Verlag GmbH & Co. KG; ISBN 9783446436251.

Office Action created Dec. 2, 2021 in related/corresponding DE Application No. 10 2020 003 588.4.

Office Action created Feb. 22, 2021 in related/corresponding DE Application No. 10 2020 003 588.4.

* cited by examiner

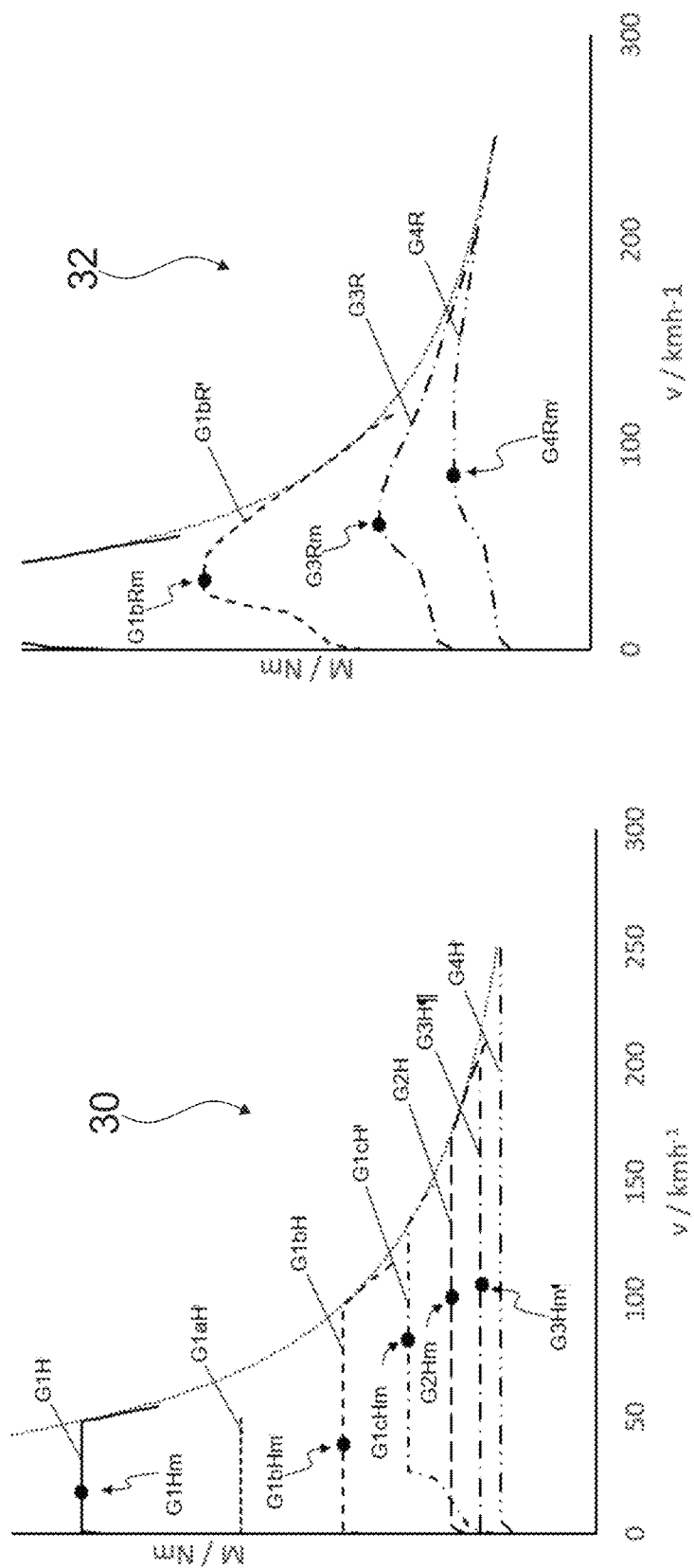

METHOD FOR CONTROLLING A HYBRID DRIVE SYSTEM FOR A MOTOR VEHICLE

BACKGROUND AND SUMMARY OF THE INVENTION

Exemplary embodiments of the invention relate to a method for controlling a hybrid drive system for a motor vehicle.

DE 35 34 971 A1 discloses a method for shifting gears of a gearbox that is part of a conventional drive train, wherein different shift modes are provided, wherein in some shift modes, as part of shift ratio changes, individual gear stages are sometimes skipped.

DE 10 2013 005 252 A1 discloses a method for shifting gears of a gearbox that is part of a hybrid drive train, wherein characteristic curves for limit torques (or limit powers) are provided for gear-shifting operations for a purely electric drive on the one hand, and wherein characteristic curves for limit torques (or limit powers) are provided for gear-shifting operations for a drive powered purely by an internal combustion engine on the other.

DE 10 2017 006 082 A1 discloses a hybrid drive train having a planetary gearbox, wherein an electric machine and an internal combustion engine are connected to two different shafts of the planetary gearbox, such that it is possible to operate the hybrid drive train in a split-power manner.

A method for controlling a hybrid drive system is already known from DE 10 2009 021 456 A1. Here, downshifts are avoided by means of a so-called boost operation, i.e., an increased provision of drive torque by an electric machine, e.g., in a situation where a vehicle accelerates significantly.

Exemplary embodiments of the invention are directed to a method of this kind to the effect that a shifting comfort and a driving comfort are increased.

The invention proceeds from a method for controlling a hybrid drive system for a motor vehicle, wherein the hybrid drive system comprises an internal combustion engine, an electric machine, a hybrid gearbox and a drive wheel, wherein the hybrid gearbox has shift units, by means of which at least a first gearbox gear, a second gearbox gear, and a third gearbox gear can be selected, wherein from the first gearbox gear, via the second gearbox gear to the third gearbox gear, a transmission ratio between a crankshaft of the internal combustion engine and an output shaft of the hybrid gearbox steadily decreases.

Here, the gearbox gears are the kind of gearbox gears where both the internal combustion engine and the electric machine are coupled with the output shaft and also with the drive wheel by means of the hybrid gearbox in a torque-transferring manner. The drive wheel is here coupled with the hybrid gearbox via a final drive in a known manner.

However, it is not absolutely necessary, either for these gearbox gears or the hybrid gearbox, that the internal combustion engine and the electric machine input their respective torques into the hybrid gearbox via the same input shaft. On the contrary, the method is particularly advantageous when the internal combustion engine and the electric machine input their respective torques into the hybrid gearbox via different input shafts.

In an operation in which both the internal combustion engine and the electric machine are introducing drive torques into the hybrid gearbox to drive the drive wheel according to the invention, third limit torques are provided for the third gearbox gear in a first mode, and second limit torques are provided for the second gearbox gear in a second mode, wherein a maximum third limit torque of the first mode is greater than a maximum second limit torque of the second mode.

A control device, i.e., a control unit or a network of control units communicating with each other, is used, as is known per se from drive systems for motor vehicles, to carry out the method for controlling the hybrid drive system. Here, the control device is equipped with a central computing and memory unit, and with a plurality of sensors and actuators connected to the central computing and memory unit. The sensors and actuators include sensors and actuators of the internal combustion engine and of the hybrid gearbox. However, the sensors and actuators also comprise further vehicle sensors and vehicle actuators, whose state parameters are used for the various ways of controlling the hybrid drive system.

Limit torques are understood to mean upper torque limit values that can occur in a particular gearbox gear, as known per se from the prior art. In a particular gearbox gear, if a signal is present for a torque requirement that is higher than the limit torque in this gear, then a downshift usually occurs, as in a lower gearbox gear, i.e., a gear with a higher ratio, higher drive wheel torques can be generated. In methods of the prior art, limit torques are, for example, specified as characteristic curves, wherein limit torques are specified for a particular gearbox gear, depending on a rotational speed of the drive wheel or on a vehicle speed.

In the invention, the limit torques or limit torque characteristic curves can be directly specified. However, the limit torques or the limit torque characteristic curves can also be indirectly specified, specifically by specifying other parameters that are physically related to the limit torques.

The limit torques are advantageously limit drive wheel torques. The drive wheel torques are entire drive torques present at the drive wheel.

A limit torque characteristic curve of a lower gearbox gear usually lies above a limit torque characteristic curve of a higher gearbox gear, wherein the lower gearbox gear means a gear with a higher ratio between crankshaft and drive wheel. Advantageously, however, in a particular gearbox gear, e.g., the third gearbox gear, far higher limit torques are permitted here in the first mode than in methods of the prior art. Therefore, in the first mode described in the invention, the limit torques for the third gearbox gear are not only higher than usual, but at least the maximum third limit torque of the first mode is greater than the maximum second limit torque of the second mode.

In this way, it is possible to use particular gearbox gears in the first mode, in particular the third gearbox gear, over a broader torque range than is usual, and therefore to leave out other particular gearbox gears, in particular the second gearbox gear. Driving comfort can thus be improved because fewer shift operations take place in the first mode than in the second mode.

The maximum third limit torque of the particular mode means the maximum of a limit torque characteristic curve for the third gearbox gear in the particular mode. The maximum second limit torque of the particular mode means the maximum of a limit torque characteristic curve for the second gearbox gear in the particular mode.

The particular mode means an operating mode for the hybrid drive system. The first mode and the second mode differ primarily in that in the first mode at least one of the limit torque characteristic curves, for example the limit torque characteristic curve of the third gearbox gear, and thus a third limit torque characteristic curve, has significantly different values than would be the case in a conventional method, or than would be the case in a different mode for the particular gear, for example for the third gearbox gear. In the invention, the third limit torque characteristic curve in the first mode has different values, in particular higher values, than a third limit torque characteristic curve in the second mode. The limit torque characteristic curve of the third gearbox gear in the first mode is particularly advantageously increased in comparison to the second mode to such an extent that the entire third limit torque characteristic curve in the first mode is higher than a limit torque characteristic curve of the second gearbox gear, thus a second limit torque characteristic curve, in the second mode.

The limit torque characteristic curve means a characteristic curve of limit torques or limit torques for a particular gear and a particular mode, wherein the limit torques are saved depending on associated rotational speeds of a drive shaft, or depending on a vehicle speed. These limit torques are the maximum torques that can occur at the particular rotational speed or the particular vehicle speed before it is necessary to change to a lower gearbox gear. In a gearbox gear and a particular mode, there are therefore different limit torques depending on rotational speed or vehicle speed.

The first mode and the second mode are advantageously each continuous modes, which can be selected by means of a manual input device, which, for example, can be directly or indirectly operated by a driver of a vehicle, or which can be automatically selected depending on parameters of the hybrid drive system. The term "continuous" means that as long as they are not manually ended, the first mode or the second mode are active for at least several minutes.

Very particularly advantageously, and alternatively to the possibility of the continuous modes described above, the particular mode is automatically selected depending on a driving situation. It is advantageous here if the particular mode is selected depending on a temporal profile of an accelerator pedal position and/or a temporal profile of a vehicle speed. For this purpose, for example, signals of an accelerator pedal sensor and or of a wheel speed sensor are used. Here it is particularly advantageous if the first mode is used in a so-called traction downshift, and the second mode is used in a traction upshift.

A traction downshift is advantageously initiated if an increase of a drive power is requested via an accelerator pedal, but the vehicle speed does not increase. For example, a traction downshift is initiated if the accelerator pedal position is increased within a time interval (such that a drive power request is raised), and the vehicle speed simultaneously remains constant or decreases or only slightly increases.

The first mode is advantageously used at least in traction downshift scenarios in which the acceleration pedal position is increased beforehand within the time interval and simultaneously the vehicle speed remains substantially constant.

A traction upshift is advantageously initiated if a constant or almost constant drive power is requested via the accelerator pedal, but the vehicle speed increases simultaneously. A traction upshift is initiated at least if the accelerator pedal position remains substantially constant within a time interval and simultaneously the vehicle speed increases.

In this way, a switch is made between the first mode and the second mode advantageously, depending on a signal change of the accelerator pedal. Especially advantageously, the first mode is selected here when an increase of the accelerator pedal position is detected simultaneously with a constant or decreasing or only slightly increasing vehicle speed, wherein the second mode is selected when a constant accelerator pedal position is detected simultaneously with an increasing vehicle speed. The detections here occur within the particular time interval.

The traction downshift means an automatic gear change starting from a gearbox gear having a lower ratio to a gearbox gear having a higher ratio with a positive internal combustion engine torque and a positive electric machine torque. Internal combustion engine torques and electric machine torques are drive torques.

The traction upshift means an automatic gear change starting from a gearbox gear having a higher ratio to a gearbox gear having a lower ratio with a positive internal combustion engine torque and a positive electric machine torque.

In the case of a traction downshift, the limit torque characteristic curve of the current gear of the first mode is advantageously decisive. In the case of a traction upshift, the limit torque characteristic curve of the next-highest gear of the second mode is advantageously decisive.

The first gearbox gear, the second gearbox gear, and the third gearbox gear are advantageously neighboring gearbox gears selectable in the second mode, such that, at least in the second mode, it is not possible to select gearbox gears having ratios lying between those of the first and second, or between those of the second and third gearbox gear.

The first gearbox gear need not be a starting gear. The first gearbox gear is simply the gearbox gear with the greatest transmission ratio of three gearbox gears considered.

In a development of the invention, it is provided that first limit torques are provided for the first gearbox gear in the second mode, and the maximum third limit torque of the first mode is greater than a maximum first limit torque of the second mode. Particularly advantageously, the entire third limit torque characteristic curve in the first mode is higher than a first limit torque characteristic curve of the first gearbox gear in the second mode.

A further development of the invention provides that the third limit torques of the first mode in a vehicle speed range between 50 km/h and 80 km/h vary by at least 10% depending on the vehicle speed. The third limit torque characteristic curve in the first mode thus advantageously has a greater spacing between the maximum third limit torque and a minimum third limit torque than in a conventional parameterization.

A further development of the invention provides that, in the second mode, in the case of traction upshifts starting from the first gearbox gear, first a second gearbox gear and then the third gearbox gear is engaged, and that, in the first mode, in the case of traction downshifts starting from the third gearbox gear, the second gearbox gear is skipped. In this embodiment, the first mode is in particular employed when traction downshifts are recognized, and the second mode in particular when traction upshifts are recognized.

In another development of the invention, it is provided that, in the first mode, in the case of both upshifts and downshifts, the second gearbox gear is always skipped, wherein, in the second mode, both in the case of upshifts and downshifts, the second gearbox gear is always used.

In a further development of the invention, it is provided that the hybrid gearbox has a planetary gearbox and that torques originating from the internal combustion engine are introduced into the planetary gearbox via a first input shaft, and torques originating from the electric machine are introduced into the planetary gearbox via a second input shaft, wherein torques are output from the hybrid gearbox via the output shaft.

In this kind of a split-power connection of two drive machines, i.e., the internal combustion engine and the electric machine, to the hybrid gearbox, raising the third limit torque characteristic curve in the first mode has a particularly advantageous effect, as in this case torque reserves of the electric machine can be particularly advantageously utilized.

Further features and advantages will become clear from the following description of figures. An exemplary embodiment of the invention is shown in the figures.

BRIEF DESCRIPTION OF THE DRAWING FIGURES

Here:

FIG. 1 shows a hybrid drive system, suitable for carrying out a method according to the invention, FIG. 2 shows curves for traction upshift limit torques for the method according to the invention and FIG. 3 shows curves for traction downshift limit torques for the method according to the invention.

DETAILED DESCRIPTION

FIG. 1 schematically shows a hybrid drive system 10 for a motor vehicle. The hybrid drive system 10 here has an internal combustion engine 12, an electric machine 14, a hybrid gearbox 16, and a drive wheel (not shown).

The hybrid gearbox 16 has a schematically shown planetary gearbox 18. The planetary gearbox 18 has a first input shaft EW1, which is coupled or can be coupled with a crankshaft (not further shown) of the internal combustion engine. The planetary gearbox has a second input shaft EW2, which is coupled or can be coupled with a rotor 24 of the electric machine. The rotor 24 is arranged coaxially to a stator 26 of the electric machine 14. The planetary gearbox 18 is coupled with a first partial gearbox 20 of the hybrid gearbox 16 by means of a first partial gearbox input shaft TW1. The planetary gearbox 18 is coupled with a second partial gearbox 22 of the hybrid gearbox by means of a second partial gearbox input shaft TW2.

The first partial gearbox 20 has two spur gear pairs, wherein, of these, a first spur gear pair forms a first gearwheel plane Z1, and a second spur gear pair a second gearwheel plane Z2.

The second partial gearbox 22 has two further spur gear pairs, wherein, of these, a third spur gear pair forms a third gearwheel plane Z3, and a fourth spur gear pair forms a fourth gearwheel plane Z4.

All four spur gear pairs or gearwheel planes Z1 to Z4 can advantageously be selected by means of shift elements, wherein a first shift element S1 is associated with the first gearwheel plane Z1, a second shift element S2 is associated with the second gearwheel plane Z2, a third shift element S3 is associated with the third gearwheel plane Z3, and a fourth shift element S4 is associated with the fourth gearwheel plane Z4. Additionally, the planetary gearbox 18 can particularly advantageously be shifted by means of a further shift element (not shown). By means of the four shift elements S1 to S4 and the further shift element, 7 different gearbox gears, i.e., two particularly low gears G1 and G1$a$, a low gear G1$b$, a first gear G1$c$, a second gear G2, a third gear G3 and a fourth gear G4, can be advantageously selected, wherein a transmission ratio between a crankshaft of the internal combustion engine and the output shaft steadily decreases in these gears in the given sequence.

An output shaft AW, which is shared by the two partial gearboxes 20, 22, is coupled or can be coupled with the drive wheel.

The method according to the invention, which remains to be described in the following, is not only applicable in a hybrid drive system 10 as shown in FIG. 1. It is important that the internal combustion engine 12 and the electric machine are connected to a hybrid gearbox, e.g., the hybrid gearbox 16, in such a way that torques originating from the internal combustion engine 12 and the electric machine 14 can be introduced into the hybrid gearbox. And further, it is important that the hybrid gearbox has at least three shift units, for example the shift units S1, S2, S3, by means of which at least three gearbox gears G1, G2, G3 can be selected.

FIG. 2 shows a so-called traction characteristic curve graph 30 for a second mode in the hybrid gearbox 16 of the hybrid drive system 10. A wheel torque M is plotted on a vertical axis of this graph, a vehicle speed v on a horizontal axis. The vehicle speed v is a variable that is worked out in the hybrid drive system 10. For example, the vehicle speed v is calculated from measured wheel speeds of the drive wheel.

A curve for second limit torques G2H for the second gearbox gear G2 in the second mode is plotted in FIG. 2. The second limit torque G2H in the second mode is dependent on the vehicle speed v. The curve of the second limit torques G2H has a maximum second limit torque G2Hm in the second mode.

Furthermore, FIG. 2 shows first limit torques G1$c$H, third limit torques G3H and fourth limit torques G4H, having allocated maximum limit torques G1$c$Hm, H3Hm and G4Hm respectively, all in the second mode in each case.

Further, FIG. 2 shows particularly low limit torques G1H, G1$a$H for the particularly low gearbox gears G1, having an associated particularly low maximum limit torque G1Hm, and low limit torques G1$b$H for the low gearbox gear G1$b$, having an associated low maximum limit torque G1$b$Hm.

FIG. 3 shows a traction characteristic curve graph 32 for a first mode in the hybrid gearbox 16 of the hybrid drive system 10. The wheel torque M is plotted again on a vertical axis of this diagram, and the vehicle speed v is plotted on a horizontal axis.

A curve for fourth limit torques G4R for the fourth gearbox gear G4 in the first mode is plotted in FIG. 3.

Further, a curve for third limit torques G3R for the third gearbox gear G3 in the first mode and a curve for low limit torques G1$b$R are plotted.

The three curves shown each have a maximum, specifically a maximum fourth limit torque G4Rm, a maximum third limit torque G3Rm and a maximum low limit torque G1$b$Rm.

The maximum fourth limit torque G4Rm of the first mode is greater than the maximum third limit torque G3Hm of the second mode.

The maximum third limit torque G3Rm of the first mode is greater than the maximum second limit torque G2Hm of the second mode.

In this exemplary embodiment, it is particularly advantageous that the maximum third limit torque G3Rm of the first mode is also greater than the maximum first limit torque G1$c$Hm of the second mode.

Advantageously, in the method according to the invention, significantly more of the gearbox gears present G1, G1$a$, G1$b$, G1$c$, G2, G3, G4 are used, as shown, in the second mode than in the first mode. Gearbox gears G2, G1$c$, G1$a$ are advantageously skipped in the first mode. A shift behavior results in the first mode that resembles a purely electric drive, in which few gears are used and high torques are available in each case. A shift behavior results in the second mode that resembles a conventional vehicle powered by an internal combustion engine, for which many gears are used and more limited torques are available or are made available in each case.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

10 Hybrid drive system
12 Internal combustion engine
14 Electric machine
16 Hybrid gearbox
18 Planetary gearbox
20 First partial gearbox
22 Second partial gearbox
24 Rotor
26 Stator
30 Traction characteristic curve graph for traction upshifts
32 Traction characteristic curve graph for traction downshifts
AW Output shaft
EW1 First input shaft
EW2 Second input shaft
G1, G1a Particularly low gearbox gears
G1b Low gearbox gear
G1c First gearbox gear
G2 Second gearbox gear
G3 Third gearbox gear
G4 Fourth gearbox gear
G1H, G1aH Limit torques for the particularly low gearbox gears in the second mode
G1bH Limit torques for the low gearbox gear in the second mode
G1cH First limit torques in the second mode
G2H Second limit torques in the second mode
G3H Third limit torques in the second mode
G4H Fourth limit torques in the second mode
G1Hm Particularly low maximum limit torque in the second mode
G1bHm Low maximum limit torque in the second mode
G1cHm First maximum limit torque in the second mode
G2Hm Second maximum limit torque in the second mode
G3Hm Third maximum limit torque in the second mode
G1bR Limit torque for the low gearbox gear in the first mode
G3R Third limit torque in the first mode
G4R Fourth limit torque in the first mode
G1bRm Maximum limit torque for the low gearbox gear in the first mode
G3Rm Third maximum limit torque in the first mode
G4Rm Fourth maximum limit torque in the first mode
TW1 First partial gearbox input shaft
TW2 Second partial gearbox input shaft

The invention claimed is:

1. A method for controlling a hybrid drive system for a motor vehicle, wherein the hybrid drive system comprises an internal combustion engine, an electric machine, a hybrid gearbox, and a drive wheel, the method comprising:
determining, while both the internal combustion engine and the electric machine are introducing drive torques into the hybrid gearbox to drive the drive wheel, whether to operate the hybrid gear box in a first mode or a second mode, wherein it is determined to operate the hybrid gearbox in the first mode in case of a traction downshift and it is determined to operate the hybrid gearbox in the second mode in case of a traction upshift;
employing third limit torques for a third gearbox gear of the hybrid gearbox when it is determined to operate the hybrid gearbox in the first mode;
employing second limit torques for a second gearbox gear of the hybrid gearbox when it is determined to operate the hybrid gearbox in the second mode,
wherein a maximum third limit torque of the first mode is greater than a maximum second limit torque of the second mode,
wherein, for traction upshifts starting from a first gearbox gear of the hybrid gearbox in the second mode, the second gearbox gear is engaged and then the third gearbox gear is engaged,
wherein, for traction downshifts starting from the third gearbox gear in the first mode, the second gearbox gear is skipped,
wherein the second gearbox gear is for traction upshifts and the second gearbox gear is always skipped for traction downshifts,
wherein the hybrid gearbox has shift units allowing selection of at least the first gearbox gear, the second gearbox gear and the third gearbox gear,
wherein from the first gearbox gear, via the second gearbox gear to the third gearbox gear, a transmission ratio between a crankshaft of the internal combustion engine and an output shaft of the hybrid gearbox steadily decreases,
wherein in the first gearbox gear, the second gearbox gear and the third gearbox gear, both the internal combustion engine and the electric machine are coupled with the drive wheel in a torque-transferring manner by the hybrid gearbox,
wherein the hybrid gearbox has a planetary gearbox having a first input shaft and a second input shaft, wherein a crankshaft of the internal combustion engine is coupled or is couplable with the first input shaft in such a way that torques originating from the internal combustion engine are introduced into the hybrid gearbox via the first input shaft,
wherein a rotor of the electric machine is coupled or couplable with the second input shaft in such a way that torques originating from the rotor are introduced into the hybrid gearbox via the second input shaft,
wherein, in a course of a power split, torques originating from the internal combustion engine are introduced into the hybrid gearbox via the first input shaft and torques originating from the electric machine are introduced into the hybrid gearbox via the second input shaft, wherein torques are output from the hybrid gearbox via the output shaft.

2. The method of claim 1, wherein first limit torques for the first gearbox gear are provided in the second mode and the maximum third limit torque of the first mode is greater than a maximum first limit torque of the second mode.

3. The method of claim 1, wherein the third limit torques of the first mode in a vehicle speed range between 50 km/h and 80 km/h vary by at least 15%, wherein the second limit torques of the second mode in the vehicle speed range between 50 km/h and 80 km/h vary by less than 5%.

4. The method of claim 1, wherein a change is made between the first mode and the second mode either depending on a position of a selector switch or depending on a signal change of an accelerator pedal.

* * * * *